(12) United States Patent
Rodrian

(10) Patent No.: US 7,084,592 B2
(45) Date of Patent: Aug. 1, 2006

(54) METHOD AND APPARATUS FOR CONTROLLING A DC MOTOR BY COUNTING CURRENT PULSES

(76) Inventor: James A. Rodrian, 1123 Lake Shore Rd., Grafton, WI (US) 53024

( * ) Notice: Subject to any disclaimer, the term of this patent is extended or adjusted under 35 U.S.C. 154(b) by 0 days.

(21) Appl. No.: 10/963,197

(22) Filed: Oct. 12, 2004

(65) Prior Publication Data

US 2006/0076913 A1    Apr. 13, 2006

(51) Int. Cl.
*H02P 1/00* (2006.01)
(52) U.S. Cl. ............... 318/272; 388/800; 388/804; 318/139
(58) Field of Classification Search ........... 318/272, 318/139, 754, 138, 439; 388/800, 804
See application file for complete search history.

(56) References Cited

U.S. PATENT DOCUMENTS

| | | | |
|---|---|---|---|
| 4,450,398 A * | 5/1984 | Bose | ............... 318/803 |
| 4,463,426 A | 7/1984 | Caddick et al. | |
| 5,497,326 A | 3/1996 | Berland et al. | |
| 5,514,977 A | 5/1996 | Agiman | |
| 5,772,291 A | 6/1998 | Byrd et al. | |
| 6,105,898 A | 8/2000 | Byrd et al. | |
| 6,243,635 B1 | 6/2001 | Swan et al. | |
| 6,262,546 B1 | 7/2001 | Draves et al. | |
| 6,293,486 B1 | 9/2001 | Byrd et al. | |
| 6,695,246 B1 | 2/2004 | Elliott et al. | |
| 2003/0107341 A1 | 6/2003 | Morris | |
| 2004/0052197 A1* | 3/2004 | Okajima | ............... 369/125 |
| 2004/0133378 A1* | 7/2004 | Todd et al. | ............... 702/115 |
| 2005/0077419 A1 | 4/2005 | Thomas et al. | |

* cited by examiner

*Primary Examiner*—Karen Masih
(74) *Attorney, Agent, or Firm*—Quarles & Brady LLP

(57) ABSTRACT

A system includes a motor for producing motion when current is supplied to the motor and a motor controller coupled to the motor for receiving a motor current signal indicative of the current supplied to the motor. The motor controller has an analog-to-digital converter for converting the motor current signal to a sampled motor current signal. The motor controller is operable to detect pulses in the sampled motor current signal, count the detected pulses to generate a first pulse count, and determine a run parameter for the motor based on the first pulse count. A method for controlling a motor includes counting a first plurality of pulses in a motor current signal produced while the motor is activated to generate a first pulse count. A second plurality of pulses is counted in the motor current signal produced while the motor is deactivated to generate a second pulse count. A run parameter for the motor is determined based on the first and second pulse counts.

35 Claims, 13 Drawing Sheets

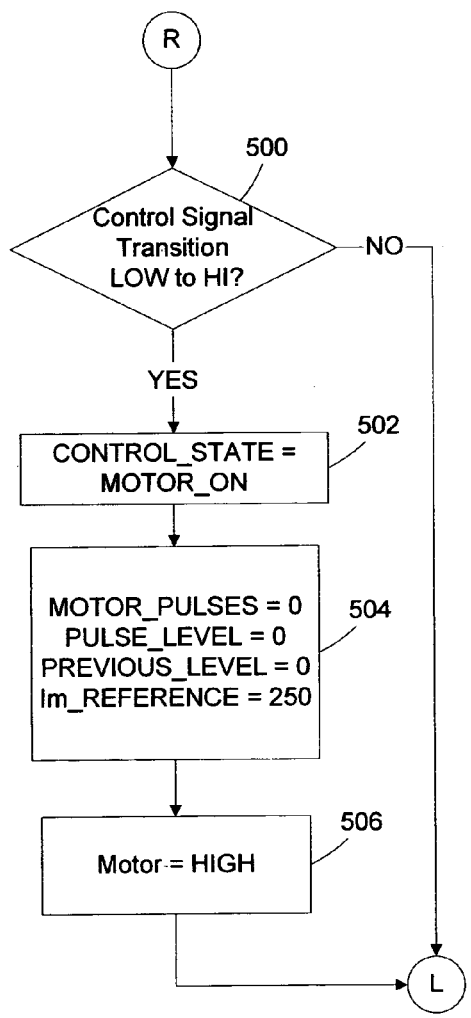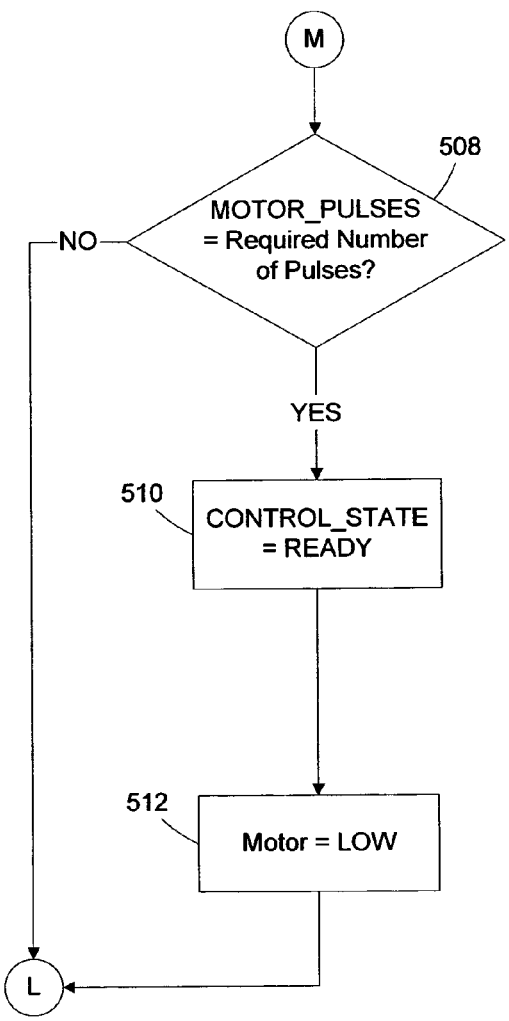
Figure 5A          Figure 5B

METHOD AND APPARATUS FOR CONTROLLING A DC MOTOR BY COUNTING CURRENT PULSES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of DC motor control, and more particularly, to a method and apparatus for controlling a DC motor by counting current pulses.

2. Description of the Related Art

Direct current (DC) motors are widely used to generate motion in a variety of products. Products that require precise control of the motion typically include a control circuit that energizes the motor for a period of time based on a required amount of motion (motor rotation). Simple time based techniques typically result in wide variation in the amount of motion. Various factors, such as friction, battery voltage, load, etc., may change over time and affect the amount of travel that occurs for a given time. Accordingly, a feedback signal may be generated by attaching a tachometer, shaft encoder, position sensor, or the like to the motor shaft, gear shaft, or linear slide. The control circuit may use the feedback signal to adjust the run time of the motor for a desired amount of motion.

An exemplary application for a DC motor that requires motion control is a paper towel dispensing system. For sanitary reasons, many bathroom installations employ hands-free equipment for flushing toilets, dispensing water, dispensing soap, and/or dispensing paper toweling. A hands-free system reduces the likelihood that germs will transfer between users. A typical hands-free paper towel dispenser is a battery-operated unit with a DC motor that is activated by a proximity sensor. A motor controller controls the DC motor to dispense a predetermined amount of paper (e.g., 12 inches) for each activation of the proximity sensor. Variation in the amount of paper dispensed can increase material costs. For example, if too little paper is dispensed, a user may be inclined to activate the dispenser more than once, thus increasing paper usage. If the dispenser is not controlled accurately, and too much paper is dispensed, material costs again increase.

One known technique for generating a signal for controlling a DC motor involves counting pulses evident in the motor current. DC motors have a fixed number of field poles. Rotation of the motor causes a fixed number of motor current pulses per revolution. Accordingly, the number of pulses may be used to calculate the number of motor rotations, which may be converted to the amount of travel for the load attached to the motor based on the gear ratios of the mechanical linkages between the motor and the load.

One limitation of pulse counting techniques lies in the difficulty in counting pulses when the motor/load is not fully loaded. During the start cycle of a motor, the motor current is at its highest magnitude, and the motor pulses can be detected relatively easily. As the motor/load reaches a steady state speed, the current drops as the rotational force required from the motor drops due to the inertia of the motor/load. At lower motor currents, the pulses are less identifiable because the magnitude of the pulses is less. The effectiveness of the motor controller is reduced because pulses are missed. Increasing the frictional loading on the system to drive up motor current may not be an effective solution as it increases the loading on the motor and results in higher power consumption, a factor that may be significant in applications where the motor is powered by a battery.

Another limitation of pulse counting techniques is that motor pulses are not always detectable after a motor is turned off. For example, many control circuits employ field effect transistors to turn the motor on and off. While the motor is running the current passing through the transistor may be monitored to count the pulses. However, once the motor is turned off, the transistor isolates the motor and the pulses can no longer be monitored. In cases where a brake is provided or the frictional characteristics of the system are such that the motor load stops relatively quickly, the coasting time of the motor/load is reduced, and the additional travel of the motor/load after it is deactivated may not be significant. However, in cases where the coast time is significant, the feedback provided by the current pulses is not available, and the additional travel may hamper the effectiveness of the motor controller. Adding a brake to the system to reduce coast time adds cost to the drive system.

Accordingly, what is needed are techniques to control a DC motor using pulse counting techniques that account for low motor currents and/or motor coast intervals. The present invention is directed to overcoming, or at least reducing the effects of, one or more of the problems set forth above.

BRIEF SUMMARY OF THE INVENTION

The present inventor has recognized that a pulse counting system may be implemented using a software-controlled microcontroller that counts pulses using digital signal techniques. The digital pulse counting system may be configured to account for pulses occurring during periods of low motor current, and/or coast periods.

One aspect of the present invention is seen in a system including a motor for producing motion when current is supplied to the motor and a motor controller coupled to the motor for receiving a motor current signal indicative of the current supplied to the motor. The motor controller has an analog-to-digital converter for converting the motor current signal to a sampled motor current signal. The motor controller is operable to detect pulses in the sampled motor current signal, count the detected pulses to generate a first pulse count, and determine a run parameter for the motor based on the first pulse count.

Another aspect of the present invention is seen in a method for controlling a motor. The method includes counting a first plurality of pulses in a motor current signal produced while the motor is activated to generate a first pulse count. A second plurality of pulses is counted in the motor current signal produced while the motor is deactivated to generate a second pulse count. A run parameter for the motor is determined based on the first and second pulse counts.

Other objects, advantages and features of the present invention will become apparent from the following specification when taken in conjunction with the accompanying drawings.

BRIEF DESCRIPTION OF THE SEVERAL VIEWS OF THE DRAWINGS

The invention may be understood by reference to the following description taken in conjunction with the accompanying drawings, in which like reference numerals identify like elements and in which:

FIGS. 5A and 5B are simplified flow diagrams of the logic implemented by the motor controller to control the motor in accordance with a first embodiment based on pulse counts while the motor is operating;

Figure 1:
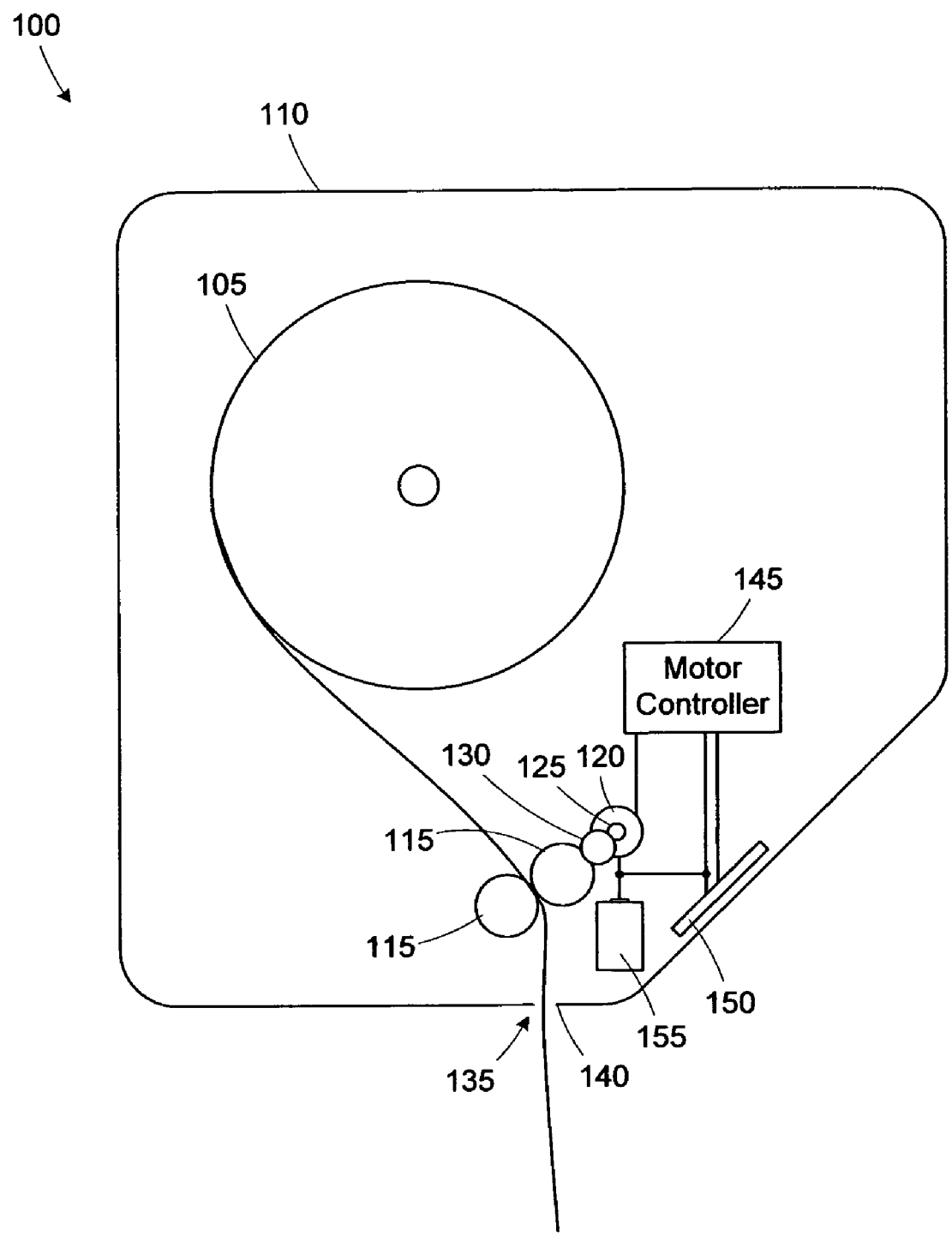
FIG. 1 is a simplified diagram of a paper towel dispenser in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

While the present invention may be embodied in any of several different forms, the present invention is described here with the understanding that the present disclosure is to be considered as setting forth an exemplification of the present invention that is not intended to limit the invention to the specific embodiment(s) illustrated. Nothing in this application is considered critical or essential to the present invention unless explicitly indicated as being "critical" or "essential."

Referring to FIG. 1, a simplified diagram of a paper towel dispenser 100 in accordance with one embodiment of the present invention is provided. The paper towel dispenser 100 includes a roll 105 of paper material supported in a housing 110. The paper passes though rollers 115. A DC motor 120 has a shaft 125 mechanically linked to at least one of the rollers 115 through a gear 130 or some other type of linkage. Paper is dispensed through a slot 135 in the housing 110. One edge 140 of the slot 135 may have a serrated surface to cut the paper as a user grasps the paper extending beyond the slot. A motor controller 145 receives an input from a proximity sensor 150 and controls the motor 120 to dispense approximately 12 inches of paper per activation. A battery 155 is provided for powering components, such as the motor 120, motor controller 145, and the proximity sensor 150. The arrangement of the components in the paper towel dispenser 100 illustrated in FIG. 1 is merely exemplary, and is not intended to represent an actual physical implementation. Although the invention is described in the context of the paper towel dispenser 100 of FIG. 1, its application is not so limited. The motor control techniques implemented by the motor controller 145 may be applied to a wide variety of motor applications.

Figure 2:
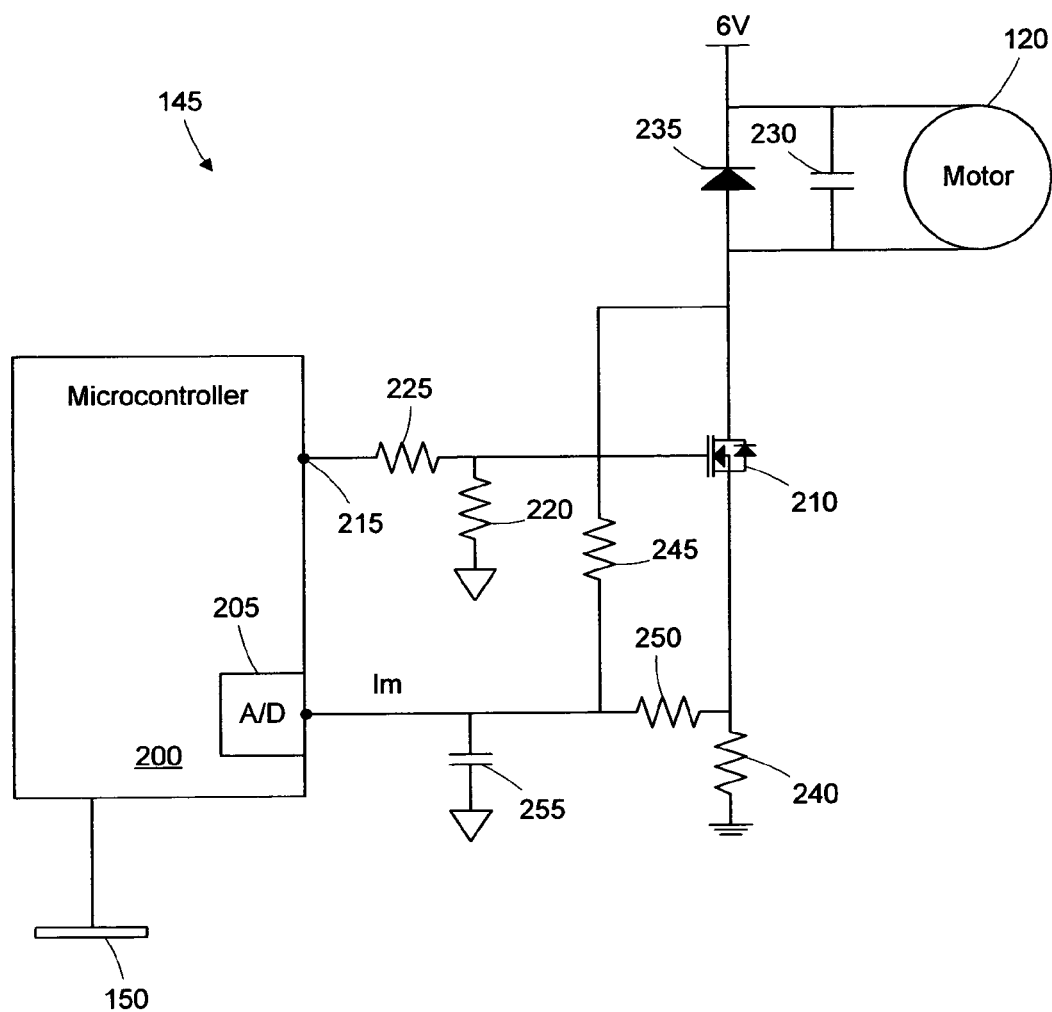
FIG. 2 is a simplified block diagram of a motor controller in accordance with present invention that may be used in the dispenser of FIG. 1.

Turning now to FIG. 2, a simplified block diagram of the motor controller 145 is provided. The motor controller 145 includes a microcontroller 200 programmed with software instructions for implementing the functions described in greater detail below. The microcontroller 200 includes an integrated analog-to-digital (A/D) converter 205 that measures the motor current digitally. The microcontroller 200 employs the data collected by the A/D converter 205 to detect the pulses in the motor current (Im) and control the motor 120 accordingly. An exemplary microcontroller suitable for performing the functions described herein is a model number MSP430F1122IPW offered commercially by Texas Instruments, Inc. of Dallas, Tex. As described in greater detail below, the microcontroller 200 may be configured to implement differing pulse counting techniques depending on the particular characteristics of the system in which it is employed (e.g., the paper towel dispenser 100).

The motor controller 145 includes a field effect transistor 210, connected to an activation output terminal 215 of the microcontroller 200 for activating the motor 120. A resistor 220 is provided to ensure that the transistor 210 is deactivated after a reset of the microcontroller 200 before its I/O ports are initialized. A resistor 225 limits short term oscillation that may occur at the input of the transistor 210 when it is activated. A capacitor 230 is coupled across the terminals of the motor 120 to reduce radiation of RF energy due to brush noise (commutator switching noise) in the motor 120. A diode 235 is also provided across the motor terminals to suppress a voltage spike that may occur when the motor 120 is turned off.

A first current sensing resistor 240 is provided to generate a voltage proportional to the motor current when the motor 120 is activated through the transistor 210. A second resistor 245 bypasses the transistor 210 and generates a voltage proportional to the motor current when the motor 120 is turned off, and the first current sensing resistor 240 is isolated by the transistor 210. The resistors 245, 250 and capacitor 255 are provided to act as a low pass anti-aliasing filter on the motor current input signal.

Figure 3A:
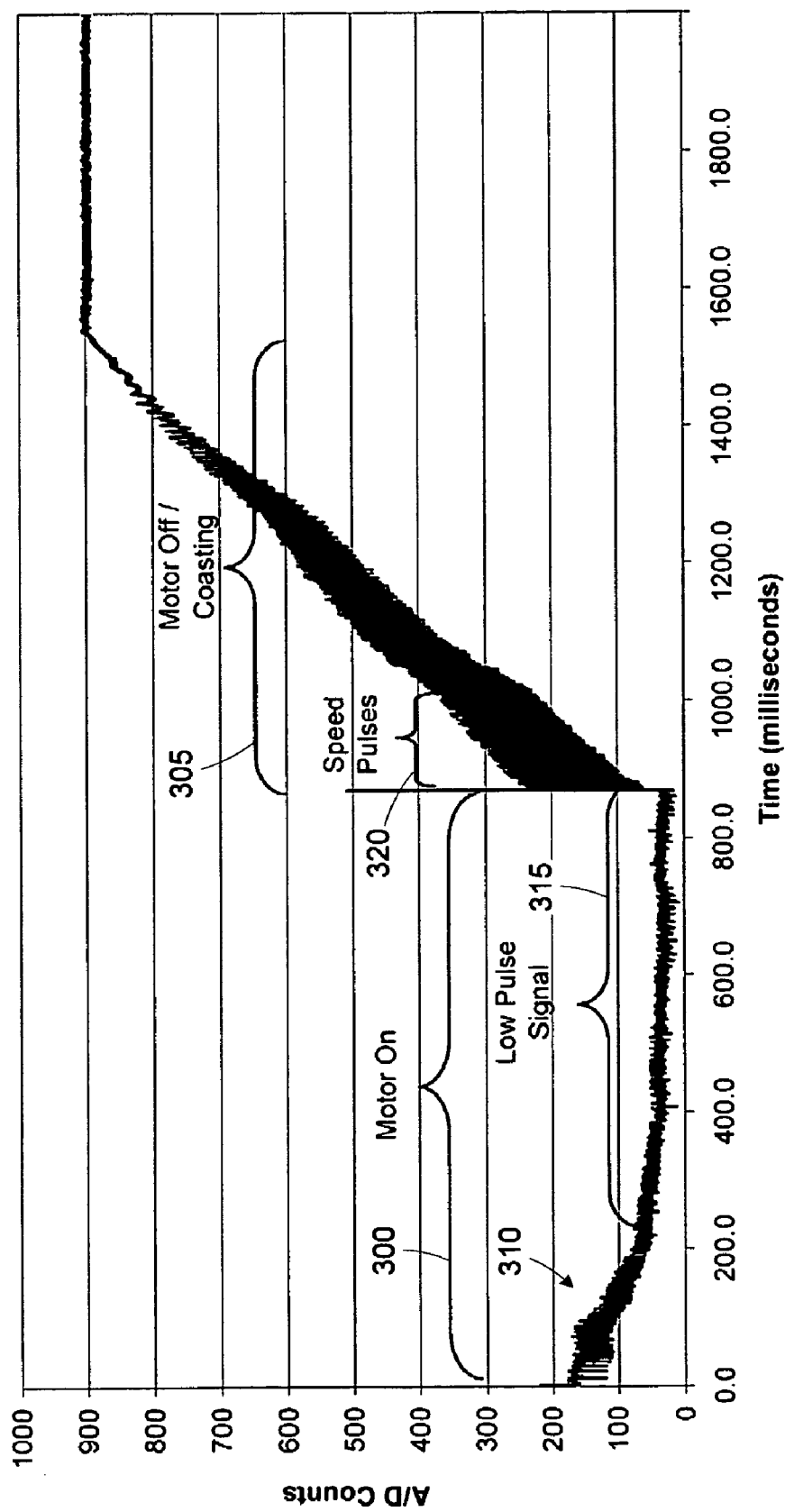
FIGS. 3A, 3B, and 3C are graphs illustrating motor current during different motor operating intervals.
Figure 3B:
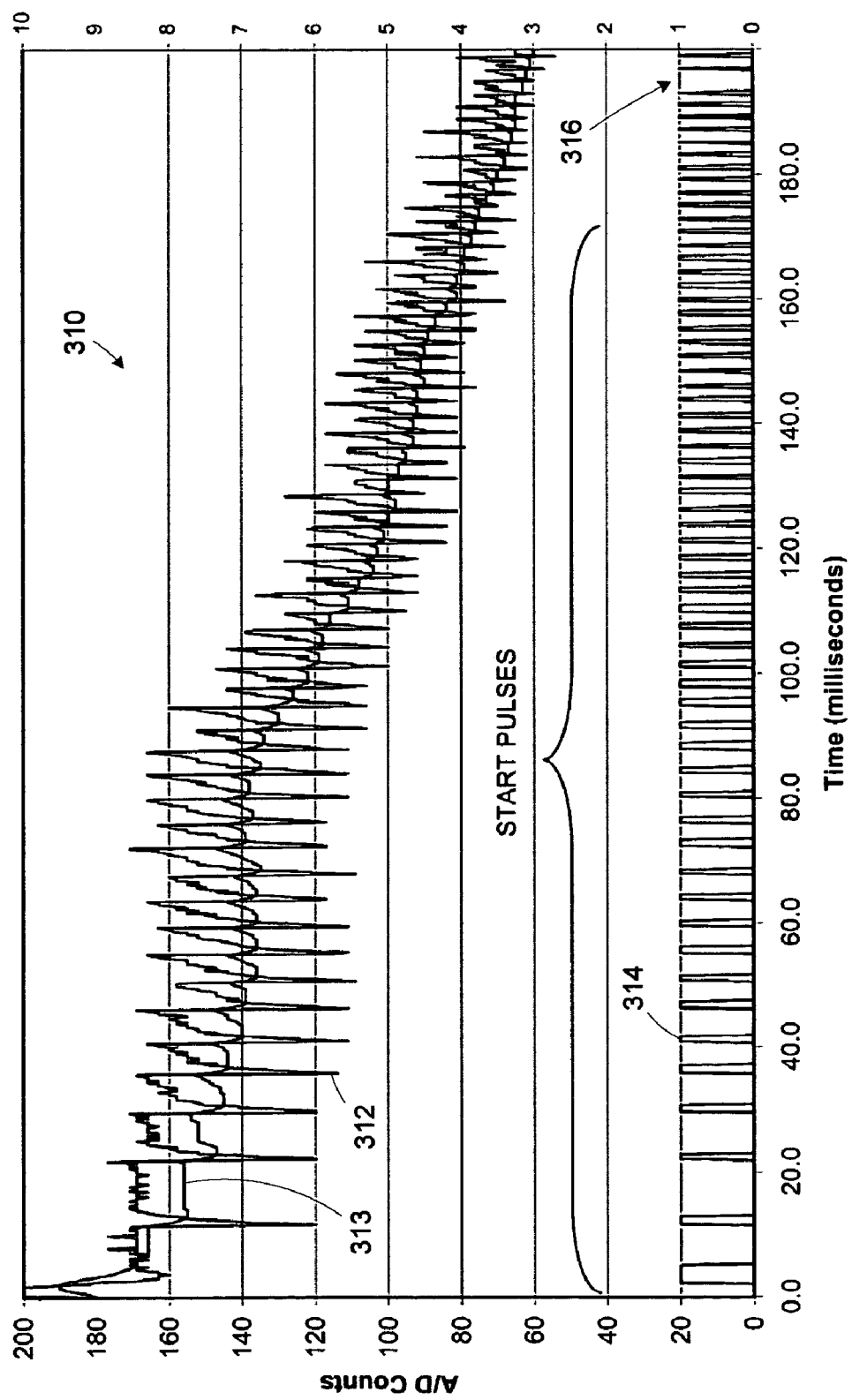
Figure 3C:
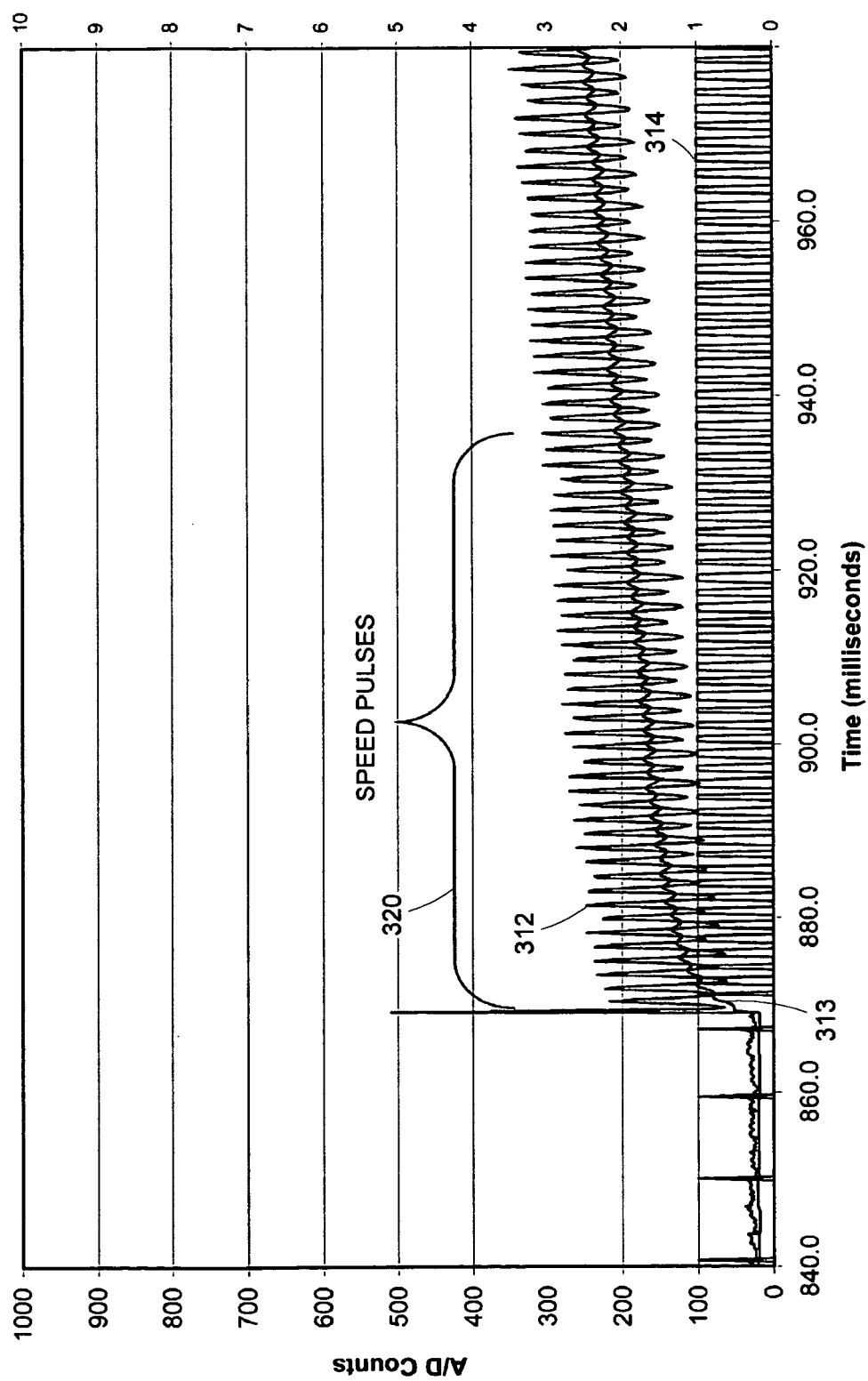

Referring now to FIGS. 3A, 3B, and 3C graphs illustrating motor current during different motor operating intervals are provided. FIG. 3A illustrates a typical motor operating cycle, FIG. 3B represents an expanded view of the motor current during the startup portion of the operating cycle, and FIG. 3C represents an expanded view of the motor current after the motor 120 is deactivated. The data in FIGS. 3A, 3B, and 3C represents the output of the A/D converter 205, expressed in counts, over the cycle. In the illustrated embodiment, each count represents approximately 10 ma. However, the scaling of the A/D converter 205 and the current levels in the motor 120 may vary depending on the particular implementation.

The operating cycle includes a "motor on" interval 300 and a "motor off" interval 305. During a start portion 310 of the motor on interval 300, it is evident that the motor current is highest and the pulses are readily discernible. In the illustrated embodiment, the motor controller 145 measures pulses by comparing the measured motor current, represented by the signal 312, to a reference current (Im_REFERENCE), represented by the signal 313 (both shown in FIG. 3B). A pulse is detected, as represented by the signal 314, when the measured motor current, Im, drops below the reference current, Im_REFERENCE, by a predetermined threshold (e.g., 2 counts or 20 ma).

As seen in FIG. 3A, as the motor 120 approaches steady state, the motor current drops, and the magnitude of the pulses also decreases, as indicated by a low pulse signal interval 315. In FIG. 3B, it is evident that the bottom peaks of the motor current pulses approach the reference current, such that the difference may be less than the threshold. FIG. 3B illustrates a missed pulse 316, where the motor current fails to drop sufficiently below the reference current.

As described in greater detail below, the motor controller 145 may detect the low pulse signal interval 315 and use a pulse approximation technique to calculate the pulses that occur during the interval. To implement the approximation, the motor controller 145 measures the pulse rate of pulses occurring immediately after the motor 120 is turned off, as represented by the speed pulses 320 in FIGS. 3A and 3C. The measured pulse rate is used to approximate the number of pulses that occurred during the low pulse signal interval 315.

Returning to FIG. 3A, during the motor off interval 305, the motor/load coasts until frictional loading causes it to stop. After the motor 120 is disabled, the A/D output drifts up to the 6V power supply voltage (e.g., around 900 counts).

The motor cycle represented by FIGS. 3A, 3B, and 3C depicts a motor that has relatively light loading at steady state speed and a significant coast period (no braking). This cycle is typical for the paper towel dispenser 100 of FIG. 1. The paper roll 105 has considerable inertia that results in a lower motor current once the roll 105 is in motion. Also, for cost reasons, the paper towel dispenser 100 is not equipped with a braking device, resulting in an appreciable coast period. In other applications, where the motor 120 is sufficiently loaded, the motor current may not drop significantly and a low pulse signal interval 315 may not be present. Also, if the motor 120 includes a braking device, the length of the motor off interval 305 may be decreased significantly, as minimal coasting may be present.

Figure 4A:
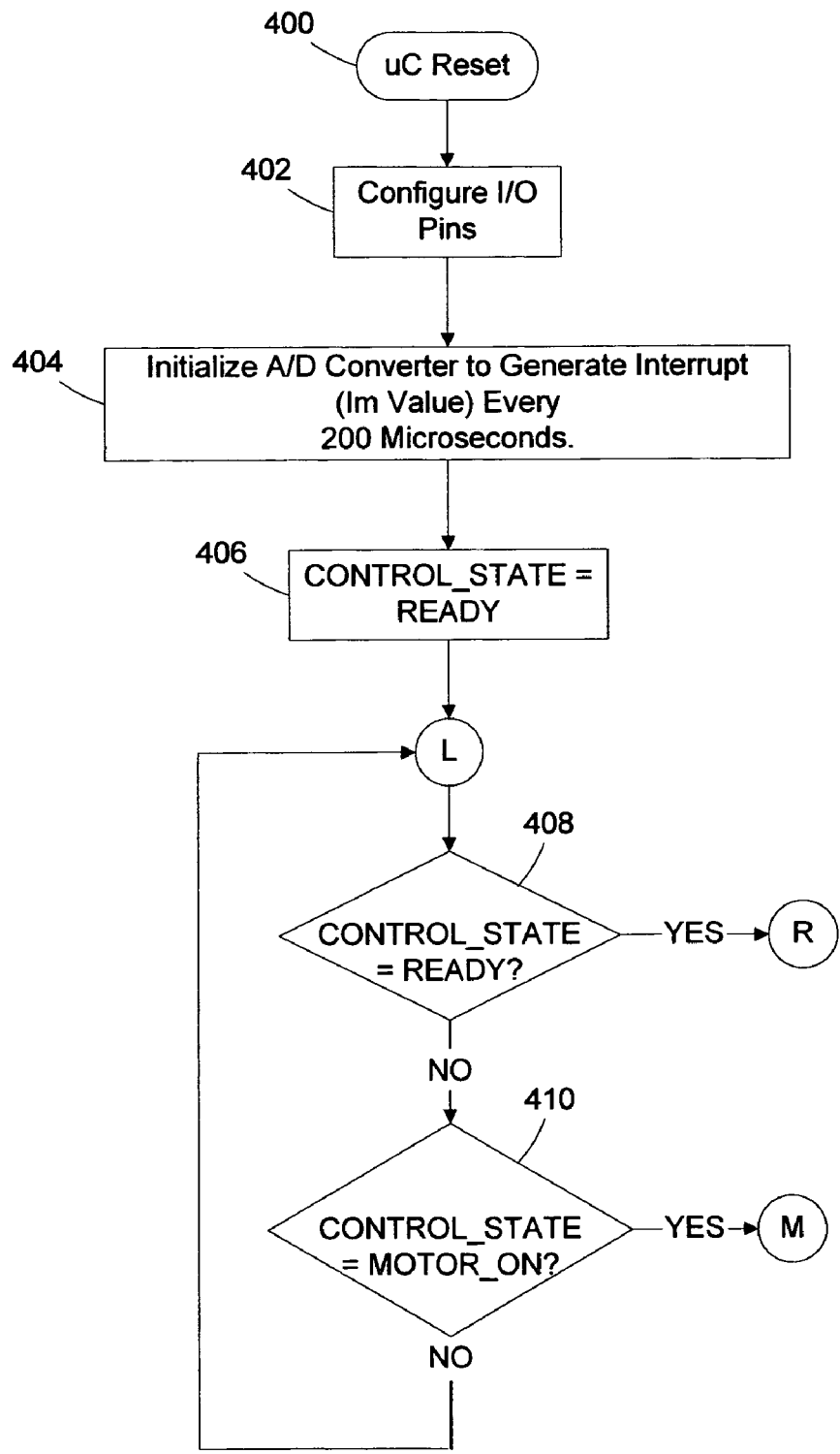
FIGS. 4A and 4B are simplified flow diagrams of the general logic implemented by the motor controller to control the motor of FIG. 1.
Figure 4B:
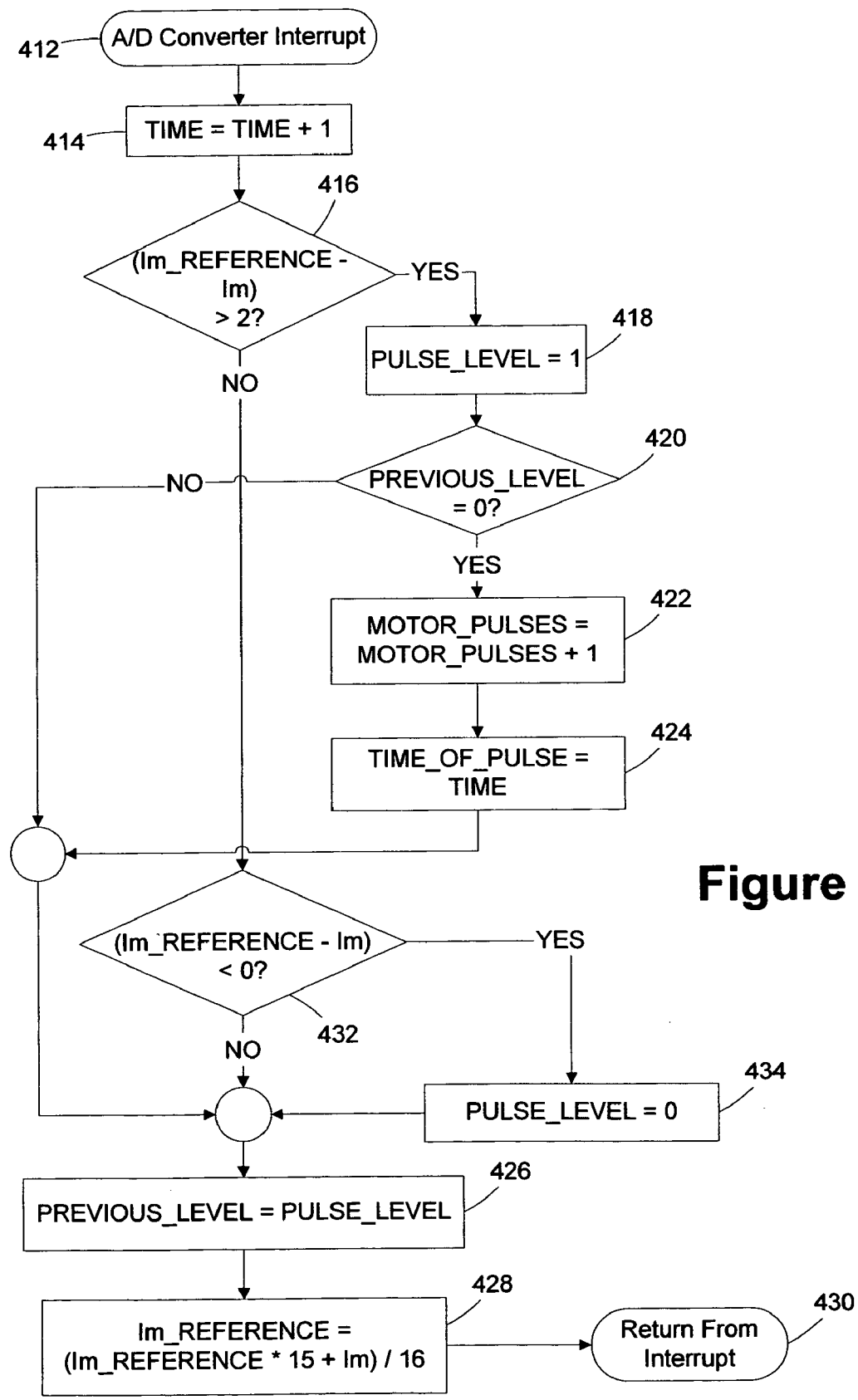

The operation of the motor controller 145, in its different embodiments, is now described in detail. FIGS. 4A and 4B represent general logic for the motor controller 145 that applies to each embodiment. Block 400 is entered when the microcontroller 200 is reset. The I/O pins are configured in block 402, and the A/D converter 205 is initialized in block 404 to generate a periodic A/D interrupt (e.g., every 200 microseconds). A CONTROL_STATE variable is initialized to a READY state in block 406. If CONTROL_STATE not READY in block 408 or MOTOR_ON in block 410, the motor controller 145 loops back to loop marker L. If the CONTROL_STATE is READY in block 408, the motor controller 145 transitions to ready marker R, and if the CONTROL_STATE is MOTOR_ON in block 410, the motor controller 145 transitions to motor on marker M. The subsequent logic at markers R and M are discussed in greater detail below depending on the particular embodiment.

Block 412 is entered following an A/D interrupt (according to the interval initialized in block 404). A TIME variable (e.g., a rolling counter) is incremented in block 414. If the difference between the reference current, Im_REFERENCE, and the motor current, Im, is less than 2 counts (e.g., approximately 20 ma in the illustrated embodiment) in block 416, a pulse is detected. Of course, other detection thresholds or equations may be used depending on the particular characteristics of the system employed. After detecting a pulse in block 416, a PULSE_LEVEL variable is set to 1 in block 418. If a PREVIOUS_LEVEL variable equals 0 in block 420, indicating that this is the first detection for the current pulse, a MOTOR_PULSES variable is incremented in block 422, and a TIME_OF_PULSE variable is set to the current TIME in block 424. The PREVIOUS PULSE variable is set to the PULSE_LEVEL in block 426, and the Im_REFERENCE value for the next iteration is calculated in block 428 using the low pass filter equation, Im_REFERENCE=(Im_REFERENCE*15+Im)/16. Of course, other equations, such as other averaging equations, may be used to generate the Im_REFERENCE value for the next iteration. The microcontroller 200 returns from the A/D interrupt in block 430.

The interrupt frequency of the A/D converter 205 should be set such that a given pulse span numerous interrupts (i.e., to avoid missing pulses). If the PREVIOUS_LEVEL equals 1 in block 420, indicating that the current pulse has already been detected, the motor controller 145 transitions to block 426 and continues as described above to complete the interrupt.

If the pulse is not detected in block 416, the motor controller 145 determines if the difference between Im_REFERENCE and Im is less than 0 in block 432 (i.e., representing the motor current rising back above the reference current after the downward spike and the end of the pulse). If the end of the pulse is detected in block 432, the PULSE_LEVEL is set back to 0, and the motor controller 145 continues in block 426 to complete the interrupt.

In a first embodiment, detailed in FIGS. 5A and 5B, the motor controller 145 is configured to control a motor 120 without a significant coasting period. Hence, the motor pulses are only counted during the motor on interval 300 of FIG. 3A. FIG. 5A represents the logic implemented by the motor controller 145 in the READY state of FIG. 4A at marker R, and FIG. 5B represents the logic implemented in the MOTOR_ON state at marker M.

In block 500, the motor controller 145 detects a transition of the control signal provided by the proximity sensor 150 of FIG. 1 indicating that an activation of the paper towel dispenser 100 is desired. If no control signal is detected, the motor controller 145 transitions back to the loop marker L. After detection of the control signal, the CONTROL_STATE is changed to MOTOR_ON in block 502. In block 504, the MOTOR_PULSES, PULSE_LEVEL, and PREVIOUS_LEVEL variables are initialized to zero, and the Im_REFERENCE variable is initialized to 250. The initialization value for Im_REFERENCE may vary depending on the particular implementation. The motor activation output terminal 215 of FIG. 2 is set at a logic high state in block 506 to activate the transistor 210 and start the motor 120. The motor controller 145 then transitions back to the loop marker L.

On the next iteration, the CONTROL_STATE will be MOTOR_ON in block 410 of FIG. 4A, and the motor controller 145 transitions to the motor on marker M, detailed in FIG. 5B. In block 508, the motor controller 145 determines if the number of MOTOR_PULSES equals a required number of pulses (i.e., the motor cycle is complete). If the required number of pulses has not been counted, the motor controller 145 transitions back to the loop marker L and the motor 120 continues to operate. If the required number of pulses has been counted, the CONTROL_STATE is set back to READY in block 510, and the motor is turned off in block 512 by deasserting the signal at the activation output terminal 215 to turn off the transistor 210. The motor controller 145 then returns to the loop marker L on FIG. 4A to await another activation.

Figure 6A:
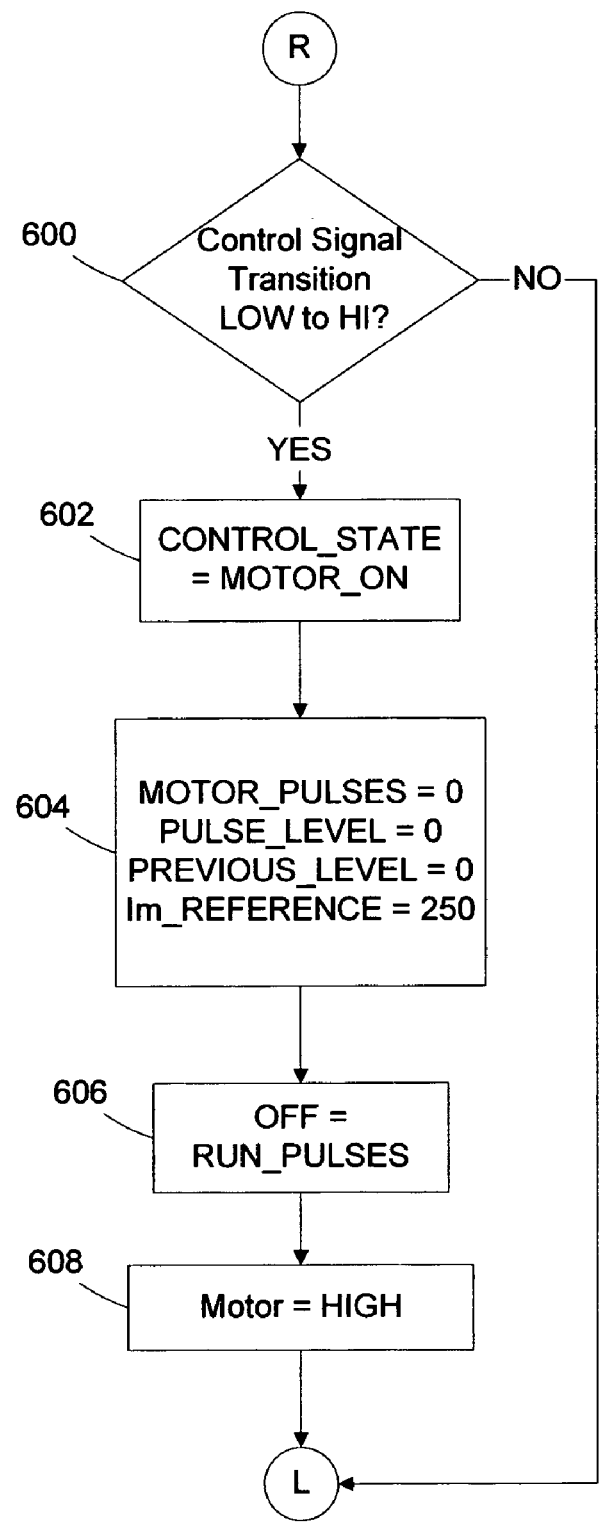
FIGS. 6A and 6B are simplified flow diagrams of the logic implemented by the motor controller to control the motor in accordance with a second embodiment based on pulse counts while the motor is operating and pulse counts while the motor is coasting after it is deactivated.
Figure 6B:
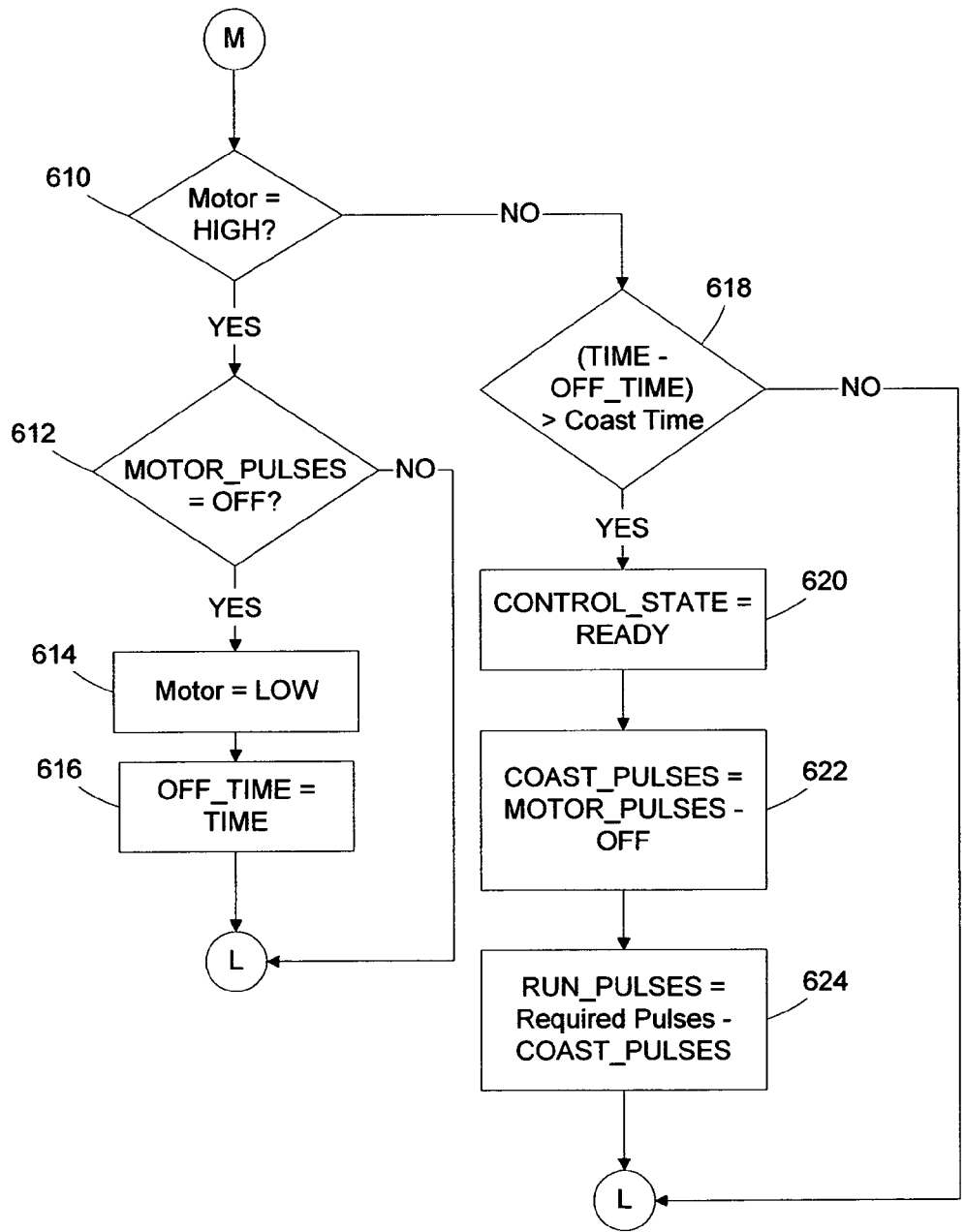

In a second embodiment, detailed in FIGS. 6A and 6B, the motor controller 145 is configured to control a motor 120 with an appreciable coasting period. Hence, the motor pulses are counted during the motor on interval 300 of FIG. 3A and during the motor off interval 305 while the motor is coasting. FIG. 6A represents the logic implemented by the motor controller 145 in the READY state of FIG. 4A at marker R, and FIG. 6B represents the logic implemented in the MOTOR_ON state at marker M.

In block 600, the motor controller 145 detects a transition of the control signal provided by the proximity sensor 150 of FIG. 1 indicating that an activation of the paper towel dispenser 100 is desired. If no control signal is detected, the motor controller 145 transitions back to the loop marker L. After detection of the control signal, the CONTROL_STATE is changed to MOTOR_ON in block 602. In block 604, the MOTOR_PULSES, PULSE_LEVEL, and PREVIOUS_LEVEL variables are initialized to zero, and the Im_REFERENCE variable is initialized to 250. The initialization value for Im_REFERENCE may vary depending on the particular implementation. An OFF variable is set to the current value of a RUN_PULSES variable in block 606. In general the OFF variable represents the number of pulses that the motor controller 145 counts during the motor on interval 300 prior to turning the motor off. The RUN_PULSES variable is a feedback variable that is set from a previous iteration that is adjusted based on the total number of pulses counted during the motor off interval 305, as will become evident later in the logic flow. The motor activation output terminal 215 of FIG. 2 is set at a logic high state in block 608 to activate the transistor 210 and start the motor 120. The motor controller 145 then transitions back to the loop marker L.

On the next iteration, the CONTROL_STATE will be MOTOR_ON in block 410 of FIG. 4A, and the motor controller 145 transitions to the motor on marker M, detailed in FIG. 6B. In block 610, the motor controller 145 determines if the motor is on. If the motor is on, the motor controller 145 determines if the counted MOTOR_PULSES is equal to the value of the OFF variable (i.e., initialized in block 606) in block 612. If the required number of pulses has not been counted, the motor controller 145 transitions back to the loop marker L and the motor 120 continues to operate. If the required number of pulses during the motor on interval 300 of FIG. 3A has been counted, the motor is turned off in block 614 by deasserting the signal at the activation output terminal 215 to turn off the transistor 210. An OFF_TIME variable is set to the current value of the TIME counter in block 616, and the motor controller 145 then returns to the loop marker L on FIG. 4A.

On the next iteration, the CONTROL_STATE is still MOTOR_ON, but the motor is off in block 610. In block 618, the motor controller 145 determines the time that the motor has been coasting by subtracting the OFF_TIME from the current TIME and comparing that time to a Coast_Time variable. The Coast_Time variable is a predetermined constant that is set depending on the expected coast time of the motor, as illustrated by the motor off interval 305 in FIG. 3A.

If the predetermined coast time has been reached in block 618, the CONTROL_STATE is returned to READY in block 620. The number of COAST_PULSES is calculated in block 622 by subtracting the value of the OFF variable from the total MOTOR_PULSES. In block 624, the value for RUN_PULSES is updated by subtracting a total number of Required Pulses (i.e., a predetermined constant) from the number of COAST_PULSES. Hence, if the coasting characteristics of the motor 120 change over time, the number of pulses that are counted during the motor on interval 300 are adjusted to compensate, such that the total number of pulses remains close to the Required Pulses constant. The motor controller 145 transitions back to the loop marker L on FIG. 4A to await another activation.

Figure 7A:
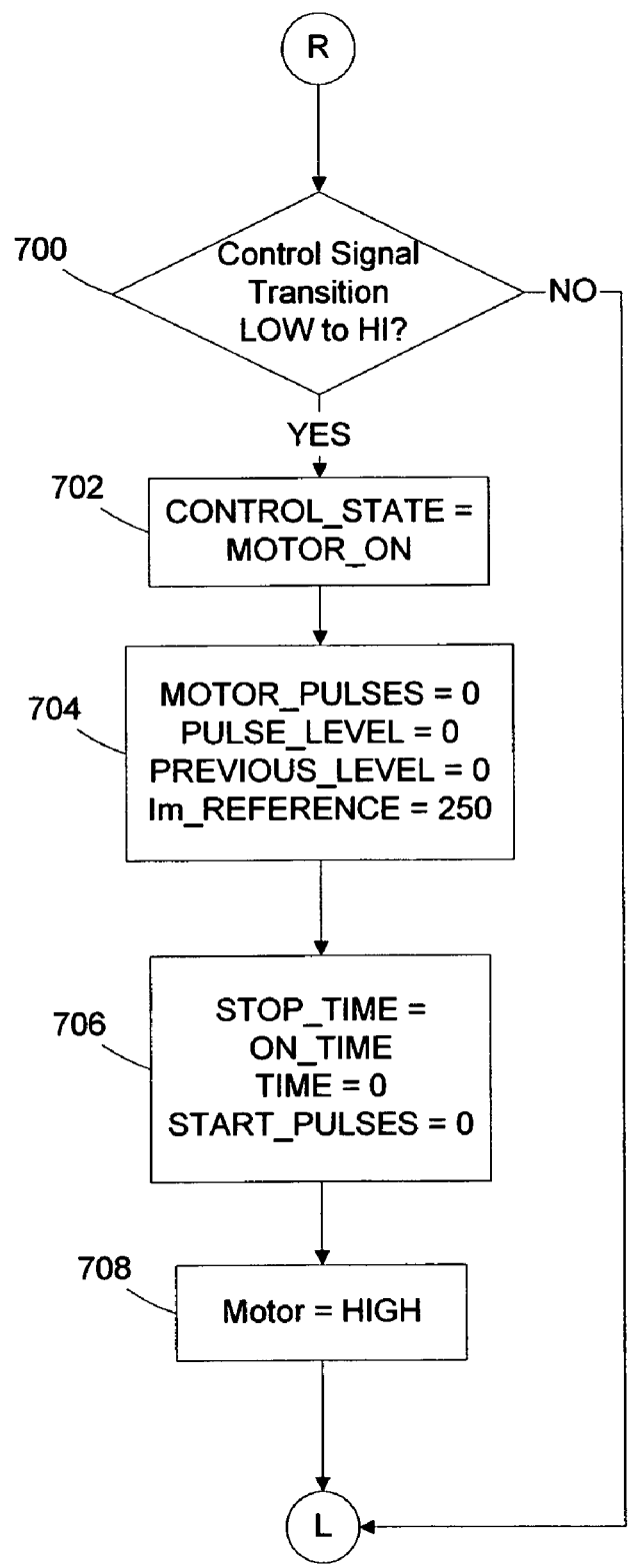
FIGS. 7A, 7B, and 7C are simplified flow diagrams of the logic implemented by the motor controller to control the motor in accordance with a third embodiment based on pulse counts while the motor is operating, pulse counts while the motor is coasting after it is deactivated, and estimated pulse counts occurring during a period of low motor current.
Figure 7B:
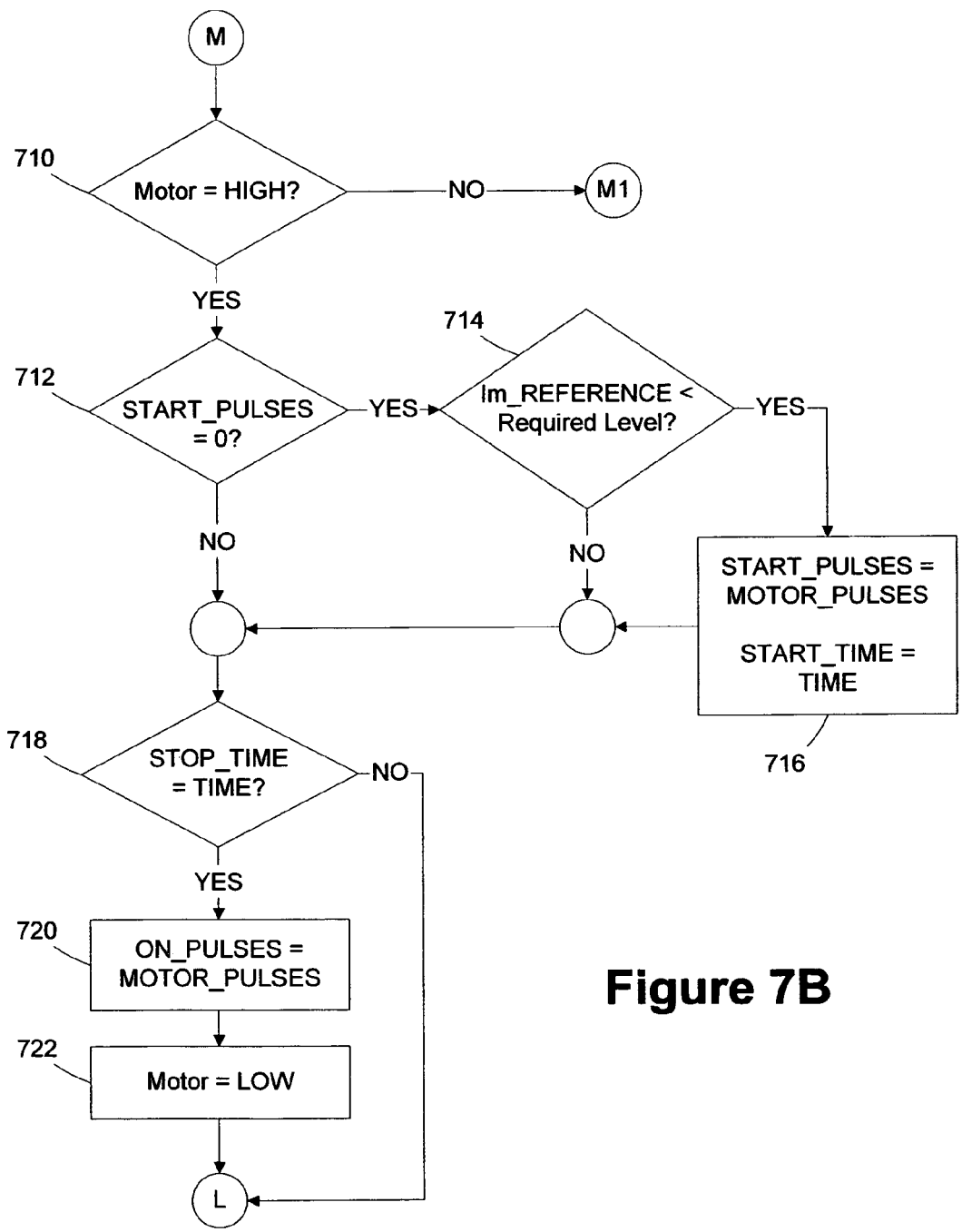
Figure 7C:
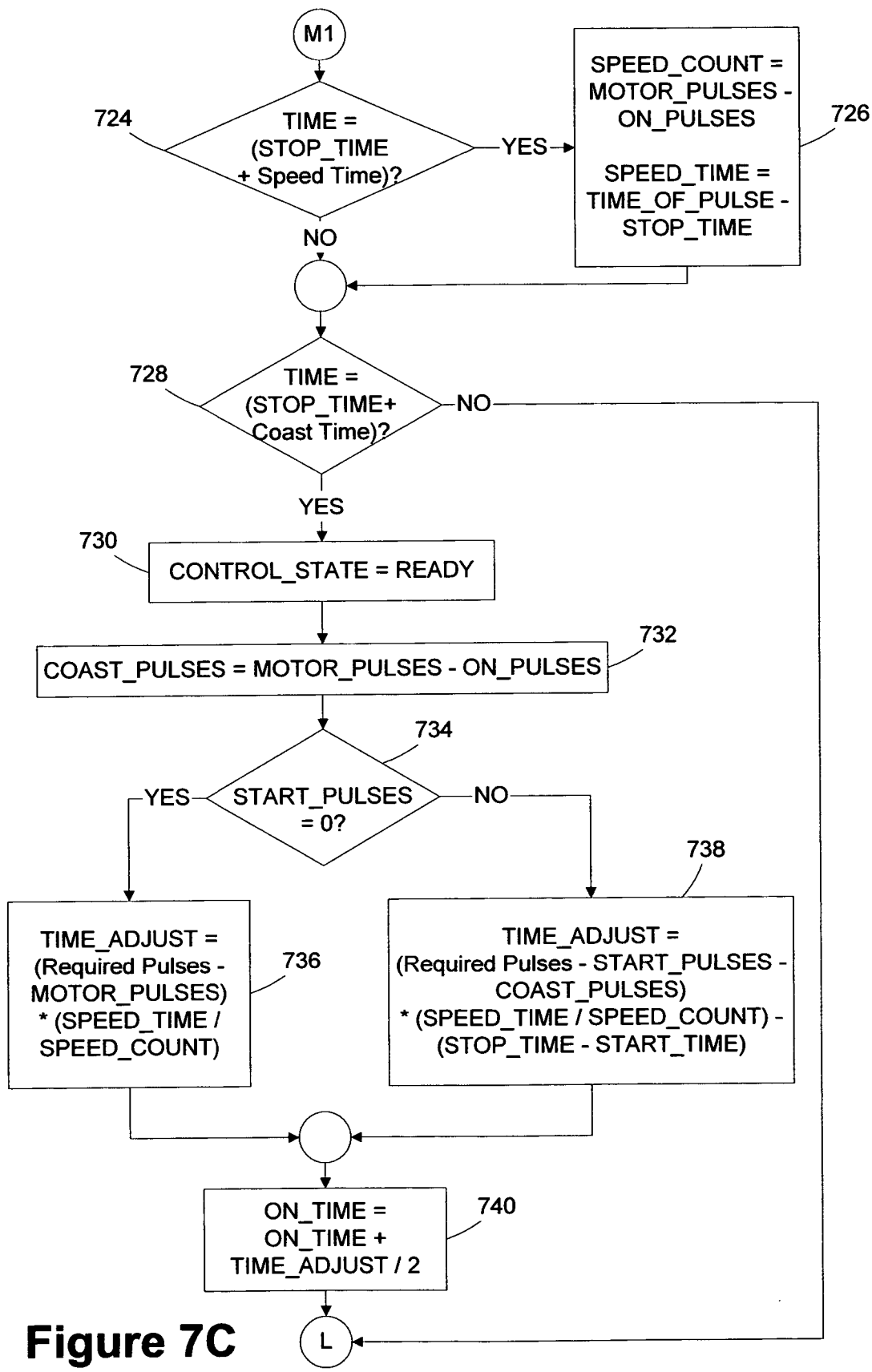

In a third embodiment, detailed in FIGS. 7A, 7B, and 7C, the motor controller 145 is configured to control a motor 120 with an appreciable coasting period and a period where the motor current drops to a level where it is difficult to detect pulses (e.g., at steady state). Hence, the motor pulses are counted during at least a portion of the motor on interval 300 of FIG. 3A and during the motor off interval 305 while the motor is coasting. The speed pulses 320 are counted to determine a motor pulse rate for the immediately previous low pulse signal interval 315 to approximate the pulses that occurred therein. FIG. 7A represents the logic implemented by the motor controller 145 in the READY state of FIG. 4A at marker R, and FIGS. 7B and 7C represents the logic implemented in the MOTOR_ON state at marker M.

In block 700, the motor controller 145 detects a transition of the control signal provided by the proximity sensor 150 of FIG. 1 indicating that an activation of the paper towel dispenser 100 is desired. If no control signal is detected, the motor controller 145 transitions back to the loop marker L. After detection of the control signal, the CONTROL_STATE is changed to MOTOR_ON in block 702. In block 704, the MOTOR_PULSES, PULSE_LEVEL, and PREVIOUS_LEVEL variables are initialized to zero, and the Im_REFERENCE variable is initialized to 250. The initialization value for Im_REFERENCE may vary depending on the particular implementation. In block 706, a STOP_TIME variable is set to the current value of an ON_TIME variable, the TIME counter is set to zero, and a START_PULSES variable is set to 0. The STOP_TIME variable represents the time included in the motor on interval 300 of FIG. 3A. As detailed below the STOP_TIME is adjusted as feedback is collected regarding the number of coast pulses and pulses occurring during the low pulse signal interval 315. The initial value of the STOP_TIME variable (prior to any iterations) may be set during the microcontroller reset based on the expected characteristics of the particular implementation. The motor activation output terminal 215 of FIG. 2 is set at a logic high state in block 708 to activate the transistor 210 and start the motor 120. The motor controller 145 then transitions back to the loop marker L.

On the next iteration, the CONTROL_STATE will be MOTOR_ON in block 410 of FIG. 4A, and the motor controller 145 transitions to the motor on marker M, detailed in FIG. 7B. In block 710, the motor controller 145 determines if the motor is on. If the motor is on, the motor controller 145 determines if the START_PULSES equals it initialized value of zero in block 712 (i.e., a low pulse signal interval has not been detected). If the START_PULSES value is zero in block 712, the Im_REFERENCE value is compared to a Required Level threshold value (e.g., 67 counts or 0.67 amps in the illustrated embodiment) in block 714. If the Im_REFERENCE value is less than the threshold, the motor controller 145 sets the START_PULSES variable to the number of counted MOTOR_PULSES and sets the START_TIME to the current TIME in block 716.

After completing either block 712 or 716, the motor controller 145 determines if the STOP_TIME equals the current TIME in block 718. If the STOP_TIME has not been reached, the motor controller 145 returns to the loop marker L. If the STOP_TIME has been reached, the ON_PULSES is set to the total number of counted MOTOR_PULSES in block 720 and the motor is turned off in block 722 by deasserting the signal at the activation output terminal 215 to turn off the transistor 210.

Returning back to block 710, if the motor is off (i.e., coasting), the motor controller 145 transitions to marker M1 shown in FIG. 7C. After the motor is turned off, the motor controller 145 counts the speed pulses 320 in FIG. 3A to approximate the speed of the motor 120 during the low pulse signal interval 315. In block 724, the current TIME is compared to the STOP_TIME that the motor was turned off plus the Speed Time, a predetermined time interval for counting pulses after the motor is turned off. If the Stop Time has elapsed, the SPEED_COUNT is calculated in block 726 by subtracting the ON_PULSES from the total number of MOTOR_PULSES, and the SPEED_TIME is calculated by subtracting the STOP_TIME from the time of the last pulse, TIME_OF_PULSE.

After completing either block 724 or block 726, the motor controller 145 determines if the coast time has elapsed in block 728 by comparing the current TIME to the STOP_TIME plus the predetermined Coast Time. If the coast time has not elapsed, the motor controller 145 returns to the loop marker L. If the coast time has elapsed, the CONTROL_STATE is returned to READY in block 730. The number of COAST_PULSES is determined by subtracting the ON_PULSES from the total MOTOR_PULSES in block 732. The motor controller 145 determines if no START_PULSES were determined in block 734. If START_PULSES still equals its initialization value of zero, the low pulse signal interval 315 was never entered, and the motor controller 145 was able to count all of the pulses during the motor on interval 300. If the START_PULSES equals zero, the motor controller 145 determines a time adjustment factor in block 736 based on the calculated speed and the counted motor pulses using the equation TIME_ADJUST=(Required Pulses−MOTOR_PULSES)* (SPEED_TIME/SPEED_COUNT). The difference between the Required Pulses and the counted MOTOR_PULSES represents a pulse error. Multiplying the pulse error by the inverse of the pulse rate determined by counting the speed pulses 320 yields a time adjustment. If too many pulses are counted, the time adjustment factor will be negative, and the ON_TIME of the motor will be decreased. Similarly, if too few pulses are counted, the time adjustment factor will be positive, and the on time of the motor will be increased.

If the number of START_PULSES does not equal zero (i.e., a low pulse signal interval 315 was detected), the motor controller 145 determines a time adjustment factor in block 738 based on the calculated speed and the counted motor pulses using the equation TIME_ADJUST=(Required Pulses−START_PULSES−COAST_PULSES)*(SPEED_TIME/SPEED_COUNT)−(STOP_TIME−START-TIME). Subtracting the START_PULSES and the COAST_PULSES from the Required Pulses yields the desired number of pulses for the low pulse signal interval 315. Multiplying the desired number of pulses by the inverse of the pulse rate calculated using the speed pulses 320 yields a calculated time that should have elapsed during the low pulse signal interval 315. The actual time that occurred in the low pulse signal interval 315 is subtracted from the calculated time to generate the time adjustment factor. Hence, if the motor 120 is coasting faster than previously determined based on the pulse rate calculated from the speed pulses 320, the difference between the calculated time and the actual time in block 738 will be negative and the ON_TIME of the motor will be decreased.

The equation of block 738 is mathematically equivalent to calculating the number of pulses that occurred in the low pulse signal interval 315 based on the determined pulse rate, subtracting the Coast Pulses and the pulses counted during the Motor On interval 300 prior to the low pulse signal interval 315 from the Required Pulses to get a pulse error, and dividing the pulse error by the calculated pulse rate to generate the time adjustment factor. That is, the equation may be rewritten as:

TIME_ADJUST=(Required Pulses−START_PULSES−COAST_PULSES−(STOP_TIME−START-TIME)* (SPEED_COUNT/SPEED_TIME))/(SPEED_COUNT/SPEED_TIME).

After calculating the TIME_ADJUST in either block 736 or block 738, the ON_TIME is adjusted by adding half of the TIME_ADJUST value to the current ON_TIME in block 740, and the motor controller 145 transitions back to the loop marker L. In the illustrated embodiment, only half of the adjustment is used to update the ON_TIME to avoid overcompensation. Of course, a different adjustment function may be employed depending on the particular implementation.

The motor controller 145 described herein has numerous advantages. Because the motor controller is implemented using a software controlled microcontroller 200, it can be easily configured to accommodate a wide variety of motor applications. If the motor 120 does not exhibit an appreciable coast time, the motor controller 145 may be configured to implement the embodiment of FIGS. 5A and 5B. If the motor 120 has a coast period, but is sufficiently loaded such that the motor current does not drop below a level suitable for detecting pulses, the motor controller 145 may be configured to implement the embodiment of FIGS. 6A and 6B. Finally, if the motor 120 does have a coast period and potential low pulse signal intervals, the motor controller 145 may be configured to implement the embodiment of FIGS. 7A, 7B, and 7C.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A system, comprising:
   a motor for producing motion when current is supplied to the motor; and
   a motor controller coupled to the motor for receiving a motor current signal indicative of at least one of motor current and voltage and having an analog-to-digital converter for converting the motor signal to a sampled motor signal, the motor controller being operable to detect pulses in the sampled motor signal while current is supplied to the motor, count the detected pulses to generate a first pulse count, and determine a run parameter for the motor based on the first pulse count.

2. The system of claim 1, wherein the motor controller is further operable to stop the supply current to the motor responsive to the first pulse count equaling a run pulse count.

3. The system of claim 1, wherein the motor controller is further operable to count the pulses in the sampled motor current signal while the supply of current to the motor is deactivated to generate a second pulse count, and determine the run parameter for the motor based on the first and second pulse counts.

4. The system of claim 3, wherein the motor controller is further operable to stop the supply of current to the motor responsive to the first pulse count equaling a run pulse count, and the run parameter comprises the run pulse count.

5. The system of claim 4, wherein the motor controller is further operable to subtract the second pulse count from a total pulse count to generate the run pulse count.

6. The system of claim 3, wherein the motor controller is further operable to stop the supply of current to the motor after a run time parameter has elapsed and update the run time parameter based on the first and second pulse counts.

7. The system of claim 6, wherein the motor controller is further operable to count a subset of the pulses in the sampled motor signal over a first time interval after the motor is deactivated to determine a pulse rate and update the run time parameter based on the first and second pulse counts and the pulse rate.

8. The system of claim 6, wherein the motor controller is further operable to identify a low pulse signal interval responsive to determining that the sampled motor signal has dropped below a predetermined threshold, count a subset of the pulses in the sampled motor signal over a first time interval after the motor is deactivated to determine a pulse rate, approximate a third pulse count occurring in the low pulse signal interval based on the determined pulse rate, and determine the run parameter based on the first, second, and third pulse counts.

9. The system of claim 8, wherein the motor controller is further operable to subtract the first, second, and third pulse counts from a required pulse count to generate a pulse error value, divide the pulse error value by the determined pulse rate to generate a time adjustment factor, and update the run time parameter based on the time adjustment factor.

10. The system of claim 1, wherein the motor controller is further operable to generate a reference signal based on the sampled motor signal, compare the reference signal to the sampled motor signal, and detect pulses in the sampled motor signal responsive to the motor signal being less than the reference signal by a predetermined threshold.

11. The system of claim 1, further comprising:
a switch connected to control the current supplied to the motor and connected to be controlled by the motor controller; and
a first resistor connected to generate a first component of the motor signal while current is supplied to the motor, and the analog-to-digital converter is coupled to the first resistor to receive the first component of the motor signal.

12. The system of claim 11, further comprising:
a second resistor coupled to generate a second component of the motor signal while current is not supplied to the motor, and the analog-to-digital converter is coupled to the first and second resistors to receive the first and second components of the motor signal.

13. The system of claim 11, further comprising a low pass filter coupled between the first resistor and the analog-to-digital converter.

14. An apparatus for controlling activation of a motor, comprising:

an analog-to-digital converter connected to sample a motor signal indicative of at least one of motor current and voltage; and
a processing device programmed with instructions that, when executed, perform a method for controlling the motor, the method comprising:
detecting pulses in the sampled motor signal while the motor is activated;
counting the pulses to generate a first pulse count; and
determining a run parameter for the motor based on the first pulse count.

15. The apparatus of claim 14, wherein the analog-to-digital converter and the processing device are formed on the same integrated circuit.

16. The apparatus of claim 14, wherein determining the run parameter in the method further comprises producing a signal for deactivating the motor responsive to the first pulse count equaling a run pulse count.

17. The apparatus of claim 14, which includes a switch for activating and deactivating the motor, and the method performed by the processing device further comprises:
counting the pulses in the sampled motor signal while the motor is deactivated to generate a second pulse count; and
determining the run parameter for the motor based on the first and second pulse counts.

18. The apparatus of claim 17, wherein the method performed by the processing device further comprises producing a signal for deactivating the motor responsive to the first pulse count equaling a run pulse count, and determining the run parameter in the method further comprises determining the run pulse count for a subsequent activation of the motor.

19. The apparatus of claim 18, wherein determining the run pulse count in the method further comprises subtracting the second pulse count from a total pulse count to generate the run pulse count.

20. The apparatus of claim 17, wherein the method performed by the processing device further comprises deactivating the motor after a run time parameter has elapsed, and determining the run parameter in the method further comprises updating the run time parameter based on the first and second pulse counts.

21. The apparatus of claim 20, wherein the method performed by the processing device further comprises counting a subset of the pulses in the sampled motor signal over a first time interval after the motor is deactivated to determine a pulse rate, and determining the run parameter in the method further comprises updating the run time parameter based on the first and second pulse counts and the pulse rate.

22. The apparatus of claim 20, wherein the method performed by the processing device further comprises:
identifying a low pulse signal interval responsive to determining that the sampled motor signal has dropped below a predetermined threshold;
counting a subset of the pulses in the sampled motor current signal over a first time interval after the motor is deactivated to determine a pulse rate;
approximating a third pulse count occurring in the low pulse signal interval based on the determined pulse rate; and
determining the run parameter based on the first, second, and third pulse counts.

23. The apparatus of claim 22, wherein determining the run parameter in the method further comprises:
subtracting the first, second, and third pulse counts from a required pulse count to generate a pulse error value;

dividing the pulse error value by the determined pulse rate to generate a time adjustment factor; and updating the run time parameter based on the time adjustment factor.

24. The apparatus of claim 14, wherein detecting the pulses in the method further comprises:

generating a reference signal based on the sampled motor signal;

comparing the reference signal to the sampled motor signal; and detecting a pulse responsive to the motor signal being less than the reference signal by a predetermined threshold.

25. A method for controlling a motor, comprising:

counting a first plurality of pulses in a motor signal indicative of at least one of motor current and motor voltage produced while the motor is activated to generate a first pulse count;

counting a second plurality of pulses in the motor current signal produced while the motor is deactivated to generate a second pulse count; and determining a run parameter for the motor based on the first and second pulse counts.

26. The method of claim 25, further comprising deactivating the motor responsive to the first pulse count equaling a run pulse count, and wherein determining the run parameter further comprises updating the run pulse count based on the first and second pulse counts.

27. The method of claim 26, wherein updating the run pulse count further comprises subtracting the second pulse count from a total pulse count to generate the run pulse count.

28. The method of claim 25, further comprising deactivating the motor after a run time parameter has elapsed, and wherein determining the run parameter further comprises updating the run time parameter based on the first and second pulse counts.

29. The method of claim 28, further comprising:

identifying a low pulse signal interval responsive to determining that the motor signal has dropped below a predetermined threshold;

counting a subset of the pulses in the second plurality of pulses to determine a pulse rate; and determining the run parameter by updating the run time parameter based on the first and second pulse counts and the pulse rate.

30. The method of claim 28, further comprising:

identifying a low pulse signal interval responsive to determining that the motor signal has dropped below a predetermined threshold;

counting a subset of the pulses in the motor signal over a first time interval after the motor is deactivated to determine a pulse rate;

approximating a third pulse count occurring in the low pulse signal interval based on the determined pulse rate; and determining the run parameter based on the first, second, and third pulse counts.

31. The method of claim 30, wherein determining the run parameter further comprises:

subtracting the first, second, and third pulse counts from a required pulse count to generate a pulse error value;

dividing the pulse error value by the determined pulse rate to generate a time adjustment factor; and updating the run time parameter based on the time adjustment factor.

32. The method of claim 25, wherein counting the first and second plurality of pulses further comprises:

generating a reference signal based on the motor signal;

comparing the reference signal to the motor signal; and detecting a pulse responsive to the motor signal being less than the reference signal by a predetermined threshold.

33. A method for controlling a motor, comprising:

counting a first plurality of pulses in a motor signal indicative of at least one of motor current and voltage produced while the motor is activated to generate a first measure of motor travel;

counting a second plurality of pulses in the motor signal produced while the motor is deactivated to generate a second measure of motor travel; and identifying a low pulse signal interval while the motor is activated responsive to determining that the motor signal has dropped below a predetermined threshold;

counting a subset of the pulses in the second plurality of pulses to determine a pulse rate;

determining a third measure of motor travel during the low pulse signal interval based on the determined pulse rate; and determining a run time parameter for the motor based on the first, second, and third measures of motor travel.

34. The method of claim 33, wherein determining the third measure of motor travel further comprises approximating a number of pulses occurring in the motor signal during the low pulse signal interval based on the determined pulse rate.

35. A paper toweling dispenser, comprising:

a roll of paper toweling;

a motor coupled to the roll; and a motor controller coupled to the motor and having an analog-to-digital converter operable to receive a motor signal indicative of at least one of motor current and voltage and generate a sampled motor signal, the motor controller being operable to detect pulses in the sampled motor signal while the motor is activated, count the pulses to generate a first pulse count, and determine a run parameter for the motor based on the first pulse count.

* * * * *

UNITED STATES PATENT AND TRADEMARK OFFICE
CERTIFICATE OF CORRECTION

PATENT NO.         : 7,084,592 B2
APPLICATION NO. : 10/963197
DATED              : August 1, 2006
INVENTOR(S)        : James A. Rodrian Page 1 of 1

It is certified that error appears in the above-identified patent and that said Letters Patent is hereby corrected as shown below:

Column 10, Claim 1, line 57, "motor current signal" -- motor signal --.

Column 11, Claim 3, line 3, "motor current signal" -- motor signal --.

Column 12, Claim 22, line 57, "motor current signal" -- motor signal --.

Column 13, Claim 25, line 18, "motor current signal" -- motor signal --.

Signed and Sealed this

Twenty-first Day of November, 2006

JON W. DUDAS
*Director of the United States Patent and Trademark Office*